United States Patent [19]

Ermak

[11] Patent Number: 4,510,064
[45] Date of Patent: Apr. 9, 1985

[54] MIXTURE OF THREE REFRIGERANTS
[75] Inventor: Boris Ermak, Minneapolis, Minn.
[73] Assignee: Robert D. Stevens, Chanhassen, Minn.
[21] Appl. No.: 579,486
[22] Filed: Feb. 13, 1984
[51] Int. Cl.³ .................................................. F25B 9/00
[52] U.S. Cl. ........................................... 252/67; 62/114
[58] Field of Search ............................. 252/67; 62/114

[56] References Cited

U.S. PATENT DOCUMENTS

| | | | |
|---|---|---|---|
| 2,479,259 | 8/1949 | Reed et al. | 252/67 |
| 3,047,506 | 7/1962 | Broadley | 252/67 |
| 3,597,183 | 8/1971 | Murphy et al. | 62/114 |
| 3,607,755 | 9/1971 | Murphy et al. | 252/67 |
| 3,634,255 | 1/1972 | Murphy et al. | 252/67 |
| 3,640,869 | 2/1972 | Orfeo et al. | 252/67 |
| 4,055,054 | 10/1977 | Murphy et al. | 62/114 |
| 4,057,973 | 11/1977 | Murphy et al. | 62/114 |
| 4,303,536 | 12/1981 | Orfeo et al. | 252/67 |
| 4,309,296 | 1/1982 | Enjo et al. | 252/67 |
| 4,344,292 | 8/1982 | Rojey | 62/114 |

Primary Examiner—Paul Lieberman
Assistant Examiner—Robert A. Wax
Attorney, Agent, or Firm—Leo Gregory

[57] ABSTRACT

A novel azeotropic mixture of the refrigerants R12, R22 and R142b in which a higher operating temperature and a lower operating pressure are attained than are attainable by any of the refrigerants of the mixture.

11 Claims, 1 Drawing Figure

| REFRIG-ERANT | TEMPERATURE EVAPORATING C° / F° | TEMP. COND. C° / F° | EVAPORATING PRESSURE K²/CM² / PSIG | EVAPORATING PRESSURE K²/CM² / PSIG | COND. PRESS. K²/CM² / PSIG | N.B.P. NORMAL BOILING PT. AT 1 ATMOS. C° / F° | MOLECULAR WEIGHT | SOLUBILITY OF OIL | SOLUBILITY OF WATER | LABORATORIES GROUP CLASSIF. |
|---|---|---|---|---|---|---|---|---|---|---|
| R-12 $CF_2Cl_2$ | -18° / 0° | 54.4° / 130° | 3.2 / 30.064 | 1.13 / 16.0514 | 13.75 / 181.01 | -29.8° / -21.64° | 120.93 | UNLIMITED | SOLUBILITY OF $H_2O$ RESTRICTED | GROUP 6 NON-FLAMMABLE |
| R22 $CHF_2Cl$ | -18° / 0° | 54.4° / 130° | 5.0 / 57.473 | 1.1 / 11.324 | 22.0 / 296.8 | -40.8° / -41.44° | 86.48 | PARTIAL LIMITABILITY | SOLUBILITY OF $H_2O$ LIMITED | GROUP 5 NON-FLAMMABLE |
| R-142b $C_2H_3F_2Cl$ | -18° / 0° | 54.4° / 130° | 2.55 / 21.51 | 0.5 / 6.8793 | 8.4 / 118.8 | -9.8° / 14.4° | 100.48 | LIMITED | SOLUBILITY OF $H_2O$ RESTRICTED | GROUP 5 LIMITED FLAMMABILITY |
| R-176 | -18° / 0° | 54.4° / 130° | 3.6 / 36.349 | 1.1 / 11.4182 | 15.14 / 215 | -26.6° / -159° | 102.626 | LIMITED | SOLUBILITY OF $H_2O$ RESTRICTED | GROUP BETWEEN 5-6 NON-FLAMMABLE |

FIG. 2

MIXTURE OF THREE REFRIGERANTS

BACKGROUND OF THE INVENTION

1. Field of Invention

This invention relates to an azeotropic mixture of refrigerants.

2. Description Of The Previous Art

It is desirable to use a refrigerant with which may be attained a high operating temperature. However in the attainment of a high operating temperature there is generally coupled a high operating pressure. A high operating pressure shortens the useful life of a compressor, as used in conventional refrigeration and air conditioning systems embodying the use of a compressor. The compressor in presenting operating problems is a costly item to maintain and to replace.

Among the commonly used refrigerants and indicated by their industrial designations are R12, R22, and R142b. Known also in the prior art are various refrigerant mixtures or compositions of two refrigerants. There is not known in the prior art of a mixture of three refrigerants and more particularly there is not known a mixture of R12, R22 and R142b.

It is known in the prior art that each mixture or composition of refrigerants is unique and that the resulting effect of any given mixture is not predictable and cannot be predetermined from the character as known of the individual refrigerants making up the mixture.

SUMMARY OF THE INVENTION

It is desirable to achieve a composition of refrigerants which will provide more desirable operating characteristics than can be attained by the use of a single refrigerant. It is desirable to have the use of a high operating temperature coupled with a relatively low operating pressure to provide an efficient coefficient of performance (COP) and to provide for cost savings in compressor maintenance and replacement.

It is therefore an object of this invention to provide a mixture or composition of refrigerants which will attain a high operating temperature and a relatively low operating pressure which will lower energy input requirements to the compressor motor and thereby increasing the coefficient of performance, reducing the cost of operating and prolonging the life of the compressor.

More particularly it is an object of this invention to provide an azeotropic refrigerant composition made up of a mixture of the refrigerants R12, R22 and R142b as ingredients in such proportions as to achieve a higher operating temperature and a lower operating pressure than is attainable by any one of said refrigerants.

It is also an object herein to provide a mixture of refrigerants as ingredients in which there is no discernable stratification or separation and which mixture shall be nonflammable and which will function as a single substance.

It is further an object of this invention to provide an azeotropic composition which may be used with all refrigeration systems without requiring any major modification and for the most part requiring no modification.

These and other objects and advantages of this invention will be set forth in the following description made in connection with the accompanying drawings in which like reference characters refer to similar parts throughout the several views

BRIEF DESCRIPTION OF THE DRAWINGS

FIG. 1 is a chart giving specific operating data for the refrigerant mixture herein and the refrigerants making up the mixture.

DESCRIPTION OF A PREFERRED EMBODIMENT

It is of relevant interest to note as previously indicated herein, that it appears to have been well established, as set forth in literature relating to the prior art, that each azeotropic composition of refrigerants is unique and the resulting effect thereof cannot be predicted by the character as known of the ingredient refrigerants (U.S. Pat. No. 3,597,183 column 2 line 22–31; U.S. Pat. No. 3,634,255, column 2, lines 10–24).

Comprising the invention herein is a mixture of the refrigerants R12, R22, and R142b. These refrigerants on an individual basis are in common use. The mixture of said refrigerants as described hereinafter has been found to result in a very desirable mixture in attaining a relatively high evaporating temperature and a relatively low head pressure and in being useable with conventional refrigeration systems without the requirement for any major modification and for the most part with no modification or change in equipment.

R12 is otherwise known as Dichlorodifluoromethane ($CCl_2F_2$), R22 is otherwise known as Chlorodifluoromethane ($CHClF_2$) and R142b is otherwise known as Chlorodifluoroethane ($CH_3CClF_2$). The industry designations of R12, R22 and R142b shall be used hereinafter.

The refrigerants R12 and R22 have desirable low boiling points which are respectively −21.64° F. and −40.8° F. at one atmosphere at 0° F. However, said refrigerants have relatively high condensing or head pressures which are respectively 181.01 psig at 130° F. and 296.8 psig at 130° F. (FIG. 1).

The refrigerant R142b in comparison with R12 and R22 has a relatively higher boiling point at 14.40° F. at one atmosphere at 0° F. However this refrigerant has a relatively low condensing pressure 118.8 psig at 130° F. (FIG. 1). The condensing pressure of R142b is very favorable for efficient performance.

The refrigerants R12, R22 and R142b have been mixed in various proportions. A very favorable proportionate mixture has been attained by a mixture of 15% by weight of the refrigerant R12, 25% by weight of the refrigerant R22 and 60% by weight of the refrigerant R142b. So long as the proportion of R142b does not exceed 60% by weight, the mixture remains nonflammable. The molecular weights of said refrigerants are R12—120.93, R22—86.48 and R142b —100.48.

It will be understood that the specified proportions may have a range with the exception that the proportion of R142b may not exceed 60% in order to have the mixture nonflammable. The refrigerants R12 and R22 may have a variance on the order of 10% in their proportional relationship and attain the performance herein indicated in functioning as a single substance.

The resulting mixture of said refrigerants shall be designated herein for purpose of identification as refrigerant R176.

The following favorable characteristics have been formed to be present in R176. The boiling point at one atmosphere at 0° F. is −15.9° F. This boiling point is between that of R12 and R22 and that of R142b—see FIG. 1. This boiling point provides very satisfactory results.

The refrigerant R176 has a condensing or head pressure of 215.0 psig at 130° F. which represents a very high coefficient of performance. This head pressure is between that of R22 which has a high condensing pressure of 296.8 psig at 130° F. and those of R12 which is at 181.01 psig and R142b which is at 118.8 psig at 130° F. R12, R22 and R142b each have a relatively low coefficient of performance and R142b is out of the range in which R12 is capable of operating.

The condensing pressure of R176 at 215.0 psig as stated is a reduction of 27% from that of R22 and represents a very favorable and satisfactory operating pressure.

A very significant finding developed in the analysis of the heat of evaporation. Reference is made to the following Table 1.

TABLE 1

| Heat Of Evaporation | |
|---|---|
| Evaporating Temperature | Heat Extracted Per Pound Of Refrigerant |
| R12 at 5° F. | 50 BTU |
| R22 at 5° F. | 70 BTU |
| R142b at 5° F. | 98.68 BTU |
| *R500 at 5° F. | 60.6 BTU |
| *R502 at 5° F. | 45.7 BTU |
| R176 at 0° F. | 92.89 BTU |
| R176 at 32° F. | 88.45 BTU |
| R176 at 122° F. | 72.036 BTU |

*other commonly used refrigerants

At the temperature of 0° F., the refrigerant mixture R176 extracts substantially 92.89 BTU per pound of refrigerant which represents an excellent coefficient of performance. By comparison, at 5° F., the refrigerant R12 extracts 50 BTU per pound of refrigerant and the refrigerant R22 extracts 70 BTU per pound of refrigerant. The refrigerant R142b at 5° F. extracts 98.68 BTU per pound of refrigerant. The refrigerant R176 in a balanced performance achieves substantially the high heat evaporation performance of R142b and the significantly low boiling point performance of R12 and R22. The mixture R176 has a higher heat of evaporation figure by 85% over the R12 and by 32.7% over R22 but in the mixture achieves the benefit of the low boiling points of R12 and R22.

With reference to Table 1, the difference between 0° F. and 5° F. are negligible and may be disregarded for purposes herein.

It has been found that there has been no discernible stratification or separation of said three refrigerants, R12, R22 and R142b, which make up the mixture R176. This mixture is not flammable. It is not toxic and it is not corrosive to equipment.

The refrigerant R176 with its excellent heat of vaporization performance (Table 1) becomes an ideal refrigerant for tropical and roof top condensers in high ambient conditions, auto air conditioning, heat pump applications, process cooling and refrigeration applications from 0° F. evaporator temperatures and ranging up to 60° F.

It has been indicated that the refrigerant R176 has distinct operating advantages over the individual refrigerants making up the mixture of R176. It is known that the advantages stated herein prevail over known refrigerants in use. It is a particular advantage that said refrigerant R176 is useable in conventional refrigerating systems without the requirement of any major modification.

It will of course be understood that various changes may be made in the form, details, arrangement and proportions of the product and in the steps and sequence of steps of the method without departing from the scope of applicant's invention which, generally stated, consists in a product and method capable of carrying out the objects above set forth, such as disclosed and defined in the appended claims.

What is claimed is:

1. A refrigerant mixture consisting of Dichlorodifluoromethane (R12), Chlorodifluoromethane (R22) and Chlorodifluoroethane (R142b) in which said R142b is not in excess of 60% by weight of said mixture and said R12 and R22 are in ratios of about three parts to five parts respectively by weight of the 40% or more of the remaining weight of said mixture, the total of the three components being 100%.

2. The refrigerant mixture of claim 1, wherein the ratios of R12 and R22 may have a variance up to 10%.

3. The refrigerant mixture of claim 1, wherein said mixture is compatible with mixtures with oil.

4. The refrigerant mixture of claim 1, wherein the proportion by weight of R142b makes the mixture nonflammable.

5. The refrigerant mixture of claim 1, wherein at a temperature of 0° F., the heat of vaporization of said refrigerant mixture is equal approximately to 92.898 BTU per pound of refrigerant.

6. The refrigerant mixture of claim 1 wherein the substantially constant boiling point of said refrigerant mixture characterizes said mixture as an azeotrope.

7. The refrigerant mixture of claim 1, wherein said mixture boils at essentially a constant temperature and functions as a single substance.

8. The refrigerant mixture of claim 1, wherein said mixture has a substantially constant boiling point of approximately −15.9° F. at one atmosphere.

9. The refrigerant mixture of claim 1, wherein the condensing pressure of said mixture at 130° F. is on the order of 215 psig.

10. A refrigerant mixture consisting of Dichlorodifluoromethane (R12), Chlorodifluoromethane (R22) and Chlorodifluoroethane (R142b) in which the weight percent of said R142b is about 60% and the weight percent of said R12 is about 15% and the weight percent of R22 is about 25% of the total weight of the mixture.

11. The process of producing refrigeration which comprises evaporating in the vicinity of a body to be cooled, a mixture consisting of about 60% by weight of Chlorodifluoroethane (R142b), about 15% by weight of Dichlorodifluoromethane (R12) and about 25% by weight of Chlorodifluoromethane (R22) in which the mixture boils at essentially a constant temperature, functions as a single substance and subsequently evaporates in the vicinity of the body to be cooled.

* * * * *